Patented June 20, 1939

2,163,563

UNITED STATES PATENT OFFICE 2,163,563

METHOD OF RECLAIMING MINERAL OILS

Walther Schrauth, Berlin-Dahlem, Germany, assignor to Deutsche Hydrierwerke Aktiengesellschaft, Berlin-Charlottenburg, Germany, a corporation of Germany No Drawing. Application February 15, 1936, Serial No. 64,168. In Germany February 16, 1935

7 Claims. (Cl. 196—50)

Repeated attempts have already been made in order to render re-employable for technical purposes certain waste fats which contain considerable amounts of unsaponifiable material and particularly mineral oils, such as fulling-, leather-extracting fats and degras. Thus it had been suggested to saponify the fatty acids or their esters present in the waste fats with alkalis or caustic alkalis and to expel from the thus formed soaps the non-saponifiable portions by distilling with water vapor. However, this method could not become technically important because, on the one hand, the thus formed soaps as well as the fatty acids obtained from the same by acidifying could not be entirely separated from unsaponifiable ingredients and because, on the other hand, the unsaponifiable portions obtained by the distillation were of but a little technical value. In any case their lubricating effect was considerably diminished in consequence of the cracking which occurred and moreover they generally, for the same reason, had a rather disagreeable smell.

Now it has been found that it is practicable to reclaim for their original application-purpose the mineral oils frequently contained in waste fats by convering into hydrocarbons—in a way well known in itself—the fats, fatty acids or esters with which they are mixed, and by submitting to the fractional distillation the obtained reaction products. The transformation of the fats, fatty acids and esters into hydrocarbons may be done e. g. in the way of the catalytic hydrogenation under high pressure or also by otherwise suitable decarboxylating methods. The high pressure catalytic hydrogenation can be carried out as suggested in co-pending application Ser. No. 496,346 filed November 17, 1930. For example, the material can be subjected to the action of hydrogen gas at a temperature between 200 and 400° C. and under a pressure of 50 to 100 or even 500 atmospheres in the presence of a hydrogenating catalyst such for example as nickel or copper or their oxides for a period of, for example, 2 or 3 hours or until the fatty material is converted to hydrocarbons. Obviously, the hydrocarbons formed will correspond in molecular weight to the molecular weight of the component radicals of the esters split or of the acids present in the treated material. In this way, besides the mineral oils remaining unaltered owing to their higher boiling point, one obtains from the mentioned fatty substances hydrocarbons with a lower boiling point that can be separated off from the former by distilling in a simple and well known manner.

For example one may proceed by letting a waste fat containing mineral oil, after freeing it from soiling and mucous stuffs by a treatment with fuller's earth, pass over an active nickel-catalyst in the presence of hydrogen under a pressure of 200 atm. and at temperatures of about 360° C. One thus obtains a hydrocarbon mixture consisting principally, besides the originally present mineral oils, of petrol-like hydrocarbons which have an absolutely indifferent smell. By fractional distillation the two ingredients can easily be separated from one another. The petrol-fraction may be re-utilized for lighting as a motor fuel, the mineral oil fraction for lubricating purposes e. g. for the making of cutting oils or also in the textile industry.

One obtains the same result by heating to about 300–330° C. the waste fat either in presence of catalysts with a decarboxylating action such as lime, copper, nickel, copper-nickel alloys, or in apparatus made of materials of a decarboxylating action with an excess of caustic alkalis or earth-alkalis. By this process the fat body present will be saponified and from the thus formed soaps the carboxyl group is eliminated.

In the above described way one therefore succeeds in reclaiming wholly the mineral oils which are contained in the waste fats and which are most useful for lubricating purposes and consequently it is possible to get thus again valuable products from those fatty materials.

I claim:

1. The method of obtaining hydrocarbons of mineral oil character from mixtures of mineral oil of relatively high molecular weight and organic fatty material, including fatty esters which mixtures are produced by the treatment with mineral oil of material containing organic fats which comprises treating such mixtures to reduce the organic fatty esters to hydrocarbons including lower molecular weight hydrocarbons and separating the lower molecular weight hydrocarbons so formed from the product.

2. The method of obtaining hydrocarbons of mineral oil character from mixtures of mineral oil of relatively high molecular weight and organic fatty material, including fatty esters, which mixtures are produced by the treatment with mineral oil of material containing organic fats which comprises subjecting such mixtures to hydrogenation in the presence of hydrogenation catalysts to convert the natural fats into hydrocarbons including lower molecular weight hydrocarbons and separating the lower molecular weight hydrocarbons so produced from the mineral oils by fractional distillation.

3. The method of obtaining hydrocarbons of mineral oil character from mixtures of mineral oil of relatively high molecular weight and organic fatty material, including fatty esters obtained in industrial processes such as the treating of leather with mineral oil which comprises subjecting such mixtures to hydrogenation by hydrogen gas in the presence of a catalyst of the group consisting of copper, nickel and copper nickel catalysts at a temperature of about 360° C. and under a pressure of about 200 atmospheres to convert the natural fats into hydrocarbons and separating the lower molecular weight hydrocarbons so formed from the mineral oil by fractional distillation.

4. The method of obtaining hydrocarbons of mineral oil character from mixtures of mineral oil of relatively high molecular weight and organic fatty material, including fatty esters, obtained in industrial processes such as the treating of leather with mineral oil which comprises subjecting such mixtures to the action of alkalies of the group consisting of caustic alkalies and earth alkalies at a temperature of 300 to 330° C. in the presence of catalysts of the group consisting of copper, nickel and copper-nickel catalysts to saponify and convert the natural fats to hydrocarbons and separating the lower boiling point products from the higher point products by fractional distillation.

5. The method of obtaining hydrocarbons of mineral oil character from mixtures of mineral oil of relatively high molecular weight and organic fatty material, including fatty esters, which mixtures are produced by the treatment with mineral oil of material containing organic fats which comprises subjecting such mixtures to high pressure catalytic hydrogenation until the organic fatty esters are converted into hydrocarbons of relatively high and relatively low molecular weight and separating the relatively low molecular weight hydrocarbons from the mixture.

6. The method of obtaining hydrocarbons of mineral oil character from mixtures of mineral oil of relatively high molecular weight and organic fatty material, including fatty esters, which mixtures are produced by the treatment with mineral oil of material containing organic fats which comprises subjecting such mixtures to the action of hydrogen at a temperature of about 200 to 400° C. and under a pressure of about 50 to 200 atmospheres until the fatty material is converted into hydrocarbons including lower molecular weight hydrocarbons and separating the lower molecular weight hydrocarbons from the resultant mixture by distillation.

7. The method of obtaining hydrocarbons of mineral oil character from mixtures of mineral oil of relatively high molecular weight and organic fatty material, including fatty esters, obtained in industrial processes such as the treating of leather with mineral oil, which comprises subjecting such mixtures to the action of hydrogen at a temperature of about 200 to 400° C. and under a pressure of about 50 to 200 atmospheres until the fatty material is converted into relatively high molecular and relatively low molecular hydrocarbons and separating the relatively low molecular hydrocarbons from the mixture.

WALTHER SCHRAUTH.